United States Patent Office 3,008,964
Patented Nov. 14, 1961

3,008,964
CERTAIN 6-AZA-1,4-DIALKYL-8-OXABICYCLO (3.2.1) OCTANES, ACYL DERIVATIVES AND PROCESS
Howard R. Guest, Charleston, Harry A. Stansbury, Jr., South Charleston, and Ben W. Kiff, Ona, W. Va., assignors to Union Carbide Corporation, a corporation of New York
No Drawing. Original application Aug. 19, 1958, Ser. No. 755,871. Divided and this application June 8, 1959, Ser. No. 822,708
7 Claims. (Cl. 260—307)

This invention relates to new chemical compounds and to a process for their preparation. More particularly the present invention relates to 3,4-dihydro-2,5-alkyl-2H-pyran-2-ylmethylamine, its functional derivatives and their method of preparation.

The Diels-Alder condensation of acrolein or an alpha-alkylacrolein such as alpha-methacrolein produces the acrolein dimer and methacrolein dimer (2,5-dimethyl-2-formyl-3,4-dihydropyran), respectively. The reaction of acrolein dimer with ammonia in the presence of hydrogen saturates the double bond in the pyran ring to produce tetrahydropyran-2-ylmethylamine.

It has now been found that when alpha-alkylacrolein dimers such as the methacrolein dimer are reacted with ammonia in the presence of hydrogen the double bond remains unaffected. The reductive amination of the alpha-alkylacrolein dimers thus produce new unsaturated primary amines by conversion of the carbonyl group to the aminoethyl group while the carbon to carbon double bond is not saturated. These new unsaturated compounds are termed 3,4-dihydro-2,5-dialkyl-2H-pyran-2-ylalkylamines.

The preparation of 3,4-dihydro-2,5-dialkyl-2H-pyran-2-ylalkylamines can be shown by the following equation wherein R represents a lower alkyl radical:

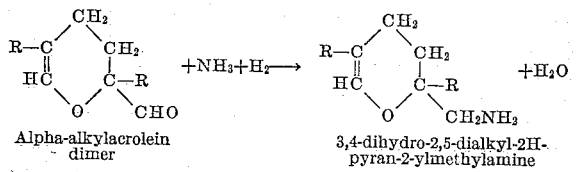

Alpha-alkylacrolein dimer                3,4-dihydro-2,5-dialkyl-2H-pyran-2-ylmethylamine The unsaturated pyran compounds of this invention are prepared by reacting an alpha-alkylacrolein dimer with anhydrous ammonia and hydrogen in the presence of a hydrogenation catalyst such as Raney nickel, Raney cobalt, etc., for periods of about 0.1 to about 10 hours. It is preferable to employ the lower alkyl derivatives of the dimers, i.e., those having from 1 to 6 carbon atoms, such as methacrolein dimer, ethylacrolein dimer, propylacrolein dimer and butylacrolein dimer. Illustrative of the novel unsaturated pyran compounds are: 3,4-dihydro-2,5-dimethyl-2H-pyran-2-ylmethylamine; 3,4-dihydro-2,5-diethyl-2H-pyran-2-ylmethylamine; and 3,4-dihydro-2,5-dipropyl-2H-pyran-2-ylmethylamine. The reaction can be conducted at pressures of about 150 to about 2,500 p.s.i.g. and preferably from 1,000 to 2,000 p.s.i.g. while the temperature of reaction can vary from about 30° C. to about 180 C. and preferably from 100 to 150° C. The novel 3,4-dihydro-2,5-dialkyl-2H-pyran-2-ylmethylamine compounds are useful as corrosion inhibitors for boiler feed water and for metal pickling baths. They are also useful as anti-livering agents for paints, for improvement of the tenacity of rayon tire cord and as intermediates for the production of other compounds such as N-acetyl 6-aza-1,4-dimethyl-8-oxabicyclo(3.2.1)octane.

The 3,4-dihydro-2,5-dialkyl-2H-pyran-2-ylmethylamine compounds can be reacted with water containing a mineral acid such as sulfuric acid, or a strong organic acid such as formic acid to produce 6-amino-2,5-dimethyl-5-hydroxyhexanal. These aminohydroxyalkehydes can be represented by the following general formula:

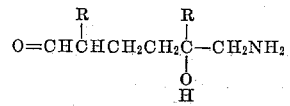

wherein R is an alkyl radical containing 1 to 6 carbon atoms. Illustrative of these compounds are: 6-amino-2,5-dimethyl-5-hydroxylhexanal; 6-amino-2,5-diethyl-5-hydroxylhexanal; 6-amino-2,5-dipropyl-5-hydroxyhexanal; and 6-amino-2,5-dibutyl-5-hydroxyhexanal. The hydration proceeds best at temperatures of 20° to 30° C. although temperatures ranging from about 0° to about 50° C. can be used. The hydration time may vary from about 0.1 to about 20 hours and preferably from 0.5 to 5 hours. Any strong water-soluble mineral acid such as sulfuric, hydrochloric, or phosphoric acid, or a strong organic acid such as formic, mono-, di, and trichloroacetic acids and the corresponding bromoacetic acids, sulfoacetic acid, oxalic acid, p-toluene sulfonic acid, and acetic acid can be used in this hydration reaction. The 6-amino-2,5-dialkyl-5-hydroxyhexanal compounds have utility in the insolubization of casein or starch adhesives used for the pigment (clay) coating of lithographic paper.

The 3,4-dihydro-2,5-dialkyl-2H-pyran-2-ylmethylamine compounds can be hydrogenated in the presence of a hydrogenation catalyst of the well known type such as Raney nickel, Raney cobalt, etc., to form 2,5-dialkyl-tetrahydropyran-2-ylmethylamine. These novel compounds can be represented by the following general formula wherein R is an alkyl radical containing from 1 to about 6 carbon atoms:

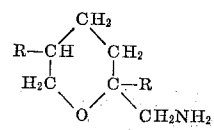

The temperature of this hydrogenation reaction can vary from 160° to 250° C. and preferably from 180° to 220° C. The pressure can vary from about 2,000 to 5,000 p.s.i.g. and preferably from 3,000 to 4,000 p.s.i.g. The alkyl substituents of these saturated pyran compounds are preferably the lower alkyl radicals, i.e., those having from 1–6 carbon atoms such as the methyl, ethyl, propyl and butyl. The 2,4-dialkyltetrahydropyran-2-yl-methylamine compounds are useful as anti-livering agent for paints, for the improvement of the tenacity of rayon tire cord and as corrosion inhibitors for boiler feed water and for metal pickling baths.

The 3,4-dihydro-2,5-dialkyl-2H-pyran-2-ylmethylamine compounds can be isomerized in the presence of concentrated mineral acids to form 6-aza-1,4-dialkyl-8-oxabicyclo(3.2.1)octane. These bicyclic amines can be represented by the following general formula:

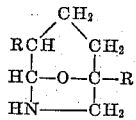

wherein R is a lower alkyl. These bicyclo compounds can be produced by using temperatures of about 10° to about 180° C. and preferably 50° to 100° C. The concentrated mineral acid employed to isomerize the 3,4-dihydro-2,5-dialkyl-2H-pyran-2 - ylmethylamine compounds can be any of the strong inorganic acids such as sulfuric, hydrochloric, or phosphoric acid. Illustrative members of these bicyclic compounds are: 6-aza-1,4-dimethyl-8-oxabicyclo(3.2.1)octane; 6-aza - 1,4-diethyl-8-oxabicyclo (3.2.1)octane; 6-aza-1,4-dipropyl-8-oxabicyclo(3.2.1)octane; and 6-aza-1,4-dibutyl-8-oxabicyclo(3.2.1)octane. These compounds are useful as solvents for nitrocellulose and other resins. They are also useful as anti-livering agents for paints, for the improvement of the tenacity of rayon tire cord and as corrosion inhibitors for boiler feed water and for metal pickling baths.

Either the 3,4-dihydro-2,5-dialkyl-2H-pyran-2-ylmethylamine or the 6-aza-1,4-dialkyl-8-oxabicyclo(3.2.1)octane compounds can be further reacted with the anhydride of an organic acid to form the corresponding amide. The novel amides can be represented by the following general formula, wherein R is a lower alkyl and R' is a lower acyl radical:

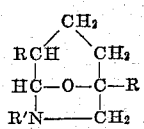

Illustrative of the novel amides of this invention are: N-butyryl-6-aza-1,4-diethyl-8-oxabicyclo(3.2.1)octane, N-acetyl-6-aza-1,4-dimethyl-8-oxabicyclo(3.2.1)octane; and N-propionyl-6-aza-1,4 - dimethyl-8 - oxabicyclo(3.2.1)octane. The temperature employed in forming the novel amides of this invention can vary from about 50° to about 180° C. and preferably from 110° to 140° C. The preferred acid anhydrides employed are those of the acids having from 1 to 6 carbon atoms such as acetic, propionic and butyric acids. The novel amides of this invention are useful as plasticizers and solvents for synthetic resins such as polyvinyl chloride and its copolymers.

The following examples are illustrative of the invention.

*Example 1*

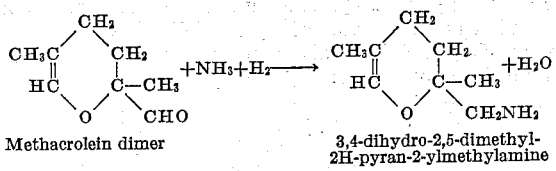

Methacrolein dimer        3,4-dihydro-2,5-dimethyl-2H-pyran-2-ylmethylamine

A mixture of 26.4 lbs. of methacrolein dimer, 10.6 lbs. of anhydrous ammonia and 1.1 lbs. of Raney nickel was hydrogenated for 1.7 hours to a temperature of 148° C. and a pressure of 2,000 p.s.i.g. The crude product was filtered and distilled to obtain 3,4-dihydro-2,5-dimethyl-2H-pyran-2-ylmethylamine having these properties: boiling range 72–75° C./10 mm., N 30/D 1.4708, sp. g. 20/20° .964, 101.2% purity by unsaturation analysis, 97.4% purity of amine analysis. The assigned structure was confirmed by infrared and mass spectrographic analyses. The yield and efficiency were 92% based on methacrolein dimer.

*Example 2*

A solution of 400 gms. of methacrolein dimer in an equal weight of benzene was saturated with anhydrous ammonia at 10° C. The mixture was hydrogenated for 2.25 hours in the presence of 40 gms. of Raney nickel to a temperature of 156° C. and a pressure of 2,000 p.s.i.g. The crude product was filtered and distilled to obtain 3,4-dihydro-2,5-dimethyl-2H-pyran-2-ylmethylamine in 94% yield based on methacrolein dimer.

*Example 3*

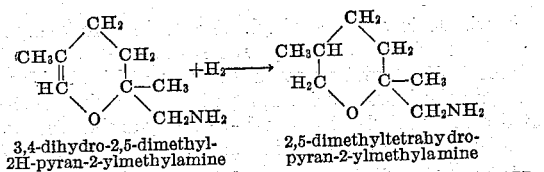

3,4-dihydro-2,5-dimethyl-2H-pyran-2-ylmethylamine        2,5-dimethyltetrahydropyran-2-ylmethylamine A mixture of 500 gms. of 3,4-dihydro-2,5-dimethyl-2H-pyran-2-ylmethylamine, 51 gms. of anhydrous ammonia and 25 gms. Raney nickel was hydrogenated at 200° C. and 3,900 p.s.i.g. for four hours. The product was filtered and distilled to obtain 2,5-dimethyltetrahydropyran-2-ylmethylamine having these properties: boiling range 69–74° C./10 mm., N 30/D 1.4554, sp. g. 20/20° 0.936, 99.6% purity by amine analysis. The assigned structure was confirmed by infrared analysis. The yield was 80%.

*Example 4*

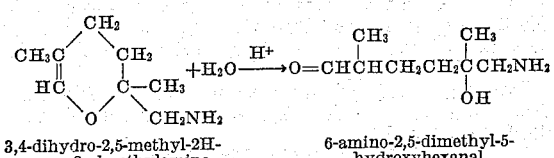

3,4-dihydro-2,5-methyl-2H-pyran-2-ylmethylamine        6-amino-2,5-dimethyl-5-hydroxyhexanal A mixture of 14 gms. of 3,4-dihydro-2,5-dimethyl-2H-pyran-2-ylmethylamine (0.10 mole), 200 ml. of water and 20 gms. of 37% concentrated hydrochloric acid (0.20 mole) was allowed to stand at 25° C. After 4.5 hours, analysis for aldehyde indicated that .093 mole of the desired aldehyde had been formed. After an additional two hours at 25° C., the solution contained 0.086 mole of the aldehyde by analysis.

A mixture of 14 gms. of 3,4-dihydro-2,5-dimethyl-2H-pyran-2-ylmethylamine (0.10 mole), 200 ml. of water and 10 gms. of 37% hydrochloric acid (0.10 mole) did not form any aldehyde, even after refluxing for one hour.

*Example 5*

A solution of 100 gms. of 96% sulfuric acid (2.0 equivalents) in 1,000 ml. of water was stirred at 25° C. while 141 gms. of 3,4-dihydro - 2,5 - dimethyl-2H-pyran-2-ylmethylamine (1.0 mole) were fed over a period of 20 minutes. The following table contains the results from the aldehyde analysis of the solution for 6-amino-2,5-dimethyl-5-hydroxyhexanal after standing at 25° C.

| Hydrolysis Time | Aldehyde, Percent by Weight | Moles of Aldehyde |
| --- | --- | --- |
| 3.0 Hours | 10.9 | 0.850 |
| 6.0 Hours | 9.7 | 0.760 |
| 23.0 Hours | 5.4 | 0.414 |
| 47.0 Hours | 1.0 | 0.077 |

These results indicate that the amino aldehyde in solution gradually cyclizes to the more stable 6-aza-1,4-dimethyl-8-oxabicyclo(3.2.1)octane. The preparation of the latter is described in Example 6.

*Example 6*

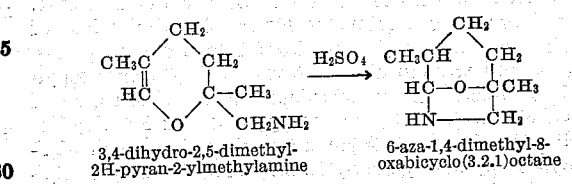

3,4-dihydro-2,5-dimethyl-2H-pyran-2-ylmethylamine        6-aza-1,4-dimethyl-8-oxabicyclo(3.2.1)octane While 392 gms. of 50% sulfuric acid (4 equivalents) were stirred at 80–85° C., 141 gms. of 3,4-dihydro-2,5-dimethyl-2H-pyran-2-ylmethylamine (1 mole) were fed over a period of 40 minutes. After a reaction period of 1 hour at 90° C., the mixture was made strongly basic by the addition of 323 gms. of 50% sodium hydroxide (4 moles). The oil layer was separated and the aqueous layer was extracted with 100 ml. of isopropyl ether. The oil and extract were combined and distilled to obtain 6-aza-1,4-dimethyl-8-oxabicyclo(3.2.1)octane having these properties: boiling range 69–71° C./10 mm., N 30/D 1.4622, sp. g. 20/20° 1.012, 97.6% purity by amine analysis. The assigned structure was confirmed by infrared and mass spectrographic studies. The yield was 86%.

Example 7

A mixture of 1700 ml. of 37% hydrochloric acid (20 moles) and 282 gms. of 3,4-dihydro-2,5-dimethyl-2H-pyran-2-ylmethylamine (2 moles) was refluxed for 5 hours. The solution was made strongly basic by the addition of 50% sodium hydroxide. The aqueous layer was separated and extracted twice with 200 ml. portions of isopropyl ether. The oil and extracts were combined and distilled to obtain 6-aza-1,4-dimethyl-8-oxabicyclo(3.2.1)-octane in 51% yield.

Example 8

A mixture of 14 gms. of 6-aza-1,4-dimethyl-8-oxabicyclo(3.2.1)octane (0.1 mole), 200 ml. of water and 20 gms. of 37% hydrochloric acid (0.2 mole) was allowed to stand at 25° C. for 1 hour. Analysis of the solution showed that no aldehyde was present. After the solution was refluxed for two hours, analysis indicated that still no aldehyde had been formed. These results demonstrate that 6-aza-1,4-dimethyl-8-oxabicyclo(3.2.1)octane is much more resistant to hydrolysis than 3,4-dihydro-2,5-dimethyl-2H-pyran-2-ylmethylamine (see Example 4).

Example 9

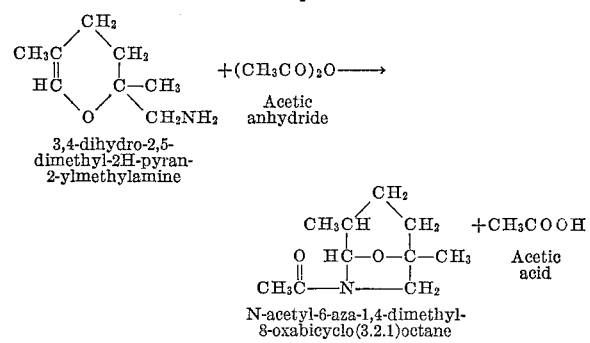

A mixture of 2040 gms. of acetic anhydride (20 moles) and 1 ml. of concentrated sulfuric acid (.0375 equivalent) was stirred at 120–130° C. while 242 gms. of 3,4-dihydro-2,5-dimethyl-2H-pyran-2 - ylmethylamine (1.72 moles) were fed over a period of 35 minutes. After a reaction period of 1 hour at 130° C., 4.1 gms. of anhydrous sodium acetate (.05 equivalent) were added to neutralize the catalyst. The mixture was distilled to obtain N-acetyl-6-aza-1,4-dimethyl-8-oxabicyclo(3.2.1)octane having these properties: boiling range 105°–108° C./2 mm., N 30/D 1.4803, sp. g. 20/20° 1.073, 182 molecular weight by the Menzies-Wright method (theory 183), 64.7% (theory 65.6%), 9.4% H (theory 9.3%), 7.3% N (theory 7.6%). The yield was 95% based on the unsaturated amine.

Example 10

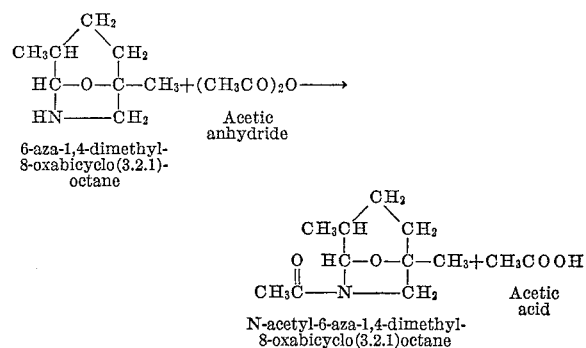

A mixture of 510 gms. of acetic anhydride (5.0 moles) and 1 ml. of concentrated sulfuric acid (.0375 equivalent) was stirred at 120–125° C. while 71 gms. of 6-aza-1,4-dimethyl-8-oxabicyclo(3.2.1)octane (.5 mole) were fed over a period of 15 minutes. After a reaction period of 2.5 hours at 130° C., 4.1 gms. of anhydrous sodium acetate (.05 equivalent) were added to neutralize the catalyst. The mixture was fractionated under reduced pressure to obtain N-acetyl - 6 - aza-1,4-dimethyl-8-oxabicyclo(3.2.1) octane in 86% yield.

Example 11

Nitrocellulose dissolved quite readily at 50° C. in amounts up to 25% by weight of the 6-aza-1,4-dimethyl-8-oxabicyclo(3.2.1)octane.

Example 12

N-acetyl-6-aza - 1,4 - dimethyl - 8-oxabicyclo(3.2.1)octane had good compatibility with a polyvinyl chloride resin having a reduced viscosity of 0.9. A sample consisting of 35% of the amide and 65% of the resin was milled for about 5 minutes at 128° C. to produce a sheet which was transparent, tough and moderately stiff. Increasing the concentration of the amide to 50% improved the flexibility without apparent effect on compatibility.

A composition containing 35% of the amide and 65% of Vinyon N resin (acrylonitrile-vinyl chloride copolymer, manufactured by Union Carbide Chemicals Co.) was milled at 115° C. for 5 minutes to form a sheet which was transparent and somewhat stiff.

This application is a division of our application S.N. 755,871, filed August 19, 1958.

What is claimed is:

1. Chemical compounds having the formula:

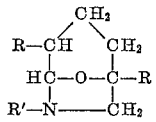

wherein R is alkyl containing from 1 to 6 carbon atoms and R' is a member selected from the group consisting of hydrogen and alkanoyl having from 1 to 6 carbon atoms.

2. A chemical compound having the formula:

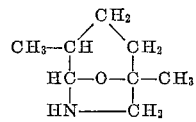

3. A chemical compound having the formula:

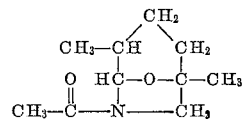

4. The process for producing 6-aza-1,4-dialkyl-8-oxabicyclo(3.2.1)octane which comprises heating 3,4-dihydro-2,5-dialkyl-2H-pyran-2-ylmethylamine in the presence of a mineral acid.

5. The process for producing 6-aza-1,4-dimethyl-8-oxabicyclo (3.2.1)octane which comprises heating 3,4-dihydro-2,5-dimethyl-2H-pyran-2-ylmethylamine in the presence of a mineral acid.

6. The process for producing N-alkanoyl-6-aza-1,4-dialkyl-8-oxabicyclo(3.2.1)octane which comprises reacting a carboxylic acid anhydride with a compound selected from the group consisting of 3,4-dihydro-2,5-dialkyl-2H-pyran-2-ylmethylamine and 6-aza-1,4-dimethyl-8-oxabicyclo(3.2.1)octane wherein the alkanoyl radical derived from said carboxylic acid anhydride contains from 1 to 6 carbon atoms.

7. The process for producing N-acetyl-6-aza-1,4-dimethyl-8-oxabicyclo(3.2.1)octane which comprises reacting acetic anhydride with a compound selected from the group consisting of 3,4-dihydro-2,5-dimethyl-2H-pyran-2-ylmethylamine and 6-aza-1,4-dimethyl - 8 - oxabicyclo-(3.2.1)octane.

References Cited in the file of this patent

Cope et al.: J. Am. Chem. Soc., vol. 77, pp. 393–6 (1955).